July 12, 1966     W. B. HOGEMAN     3,260,742
PROCESS FOR RECOVERY OF ADIPIC ACID PRECURSORS
Filed Sept. 18, 1962
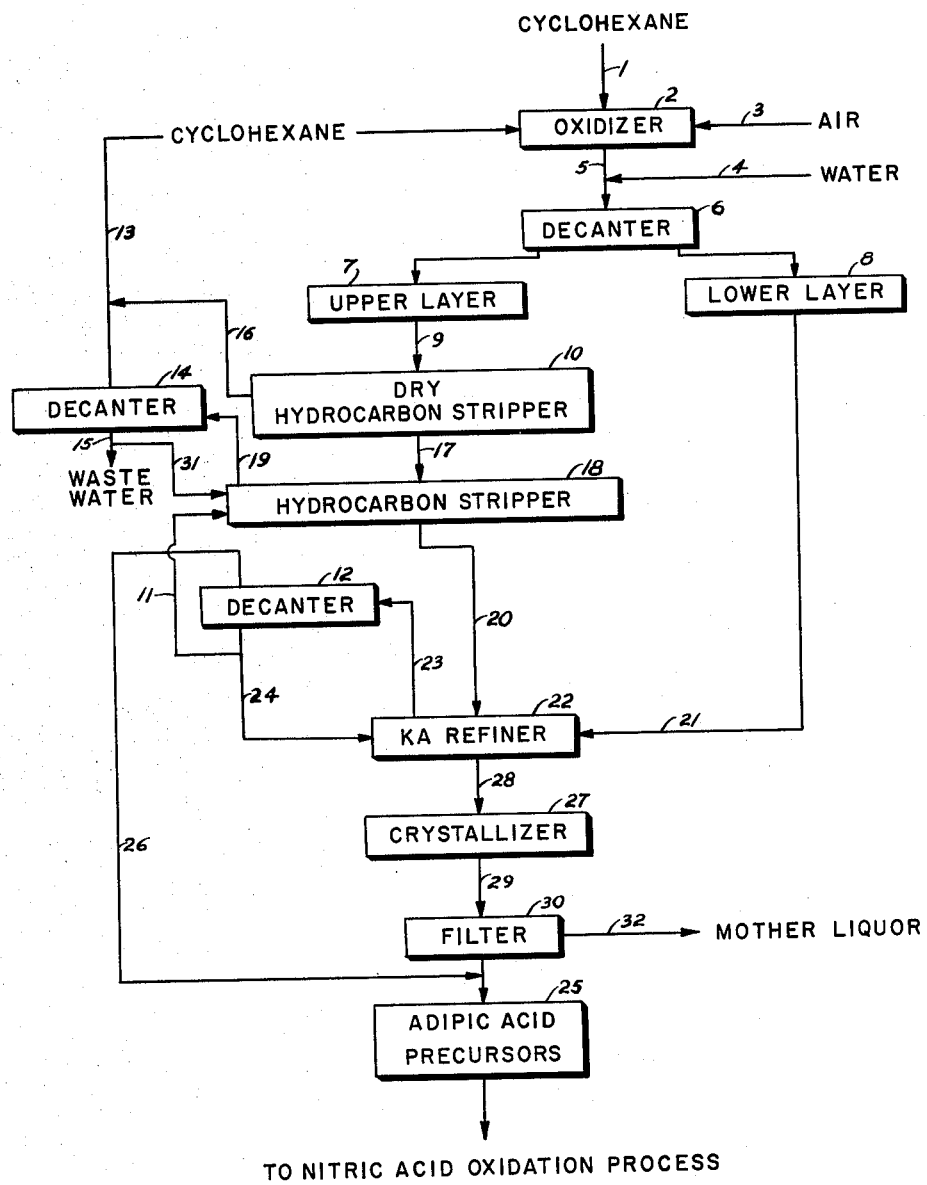
INVENTOR.
WYLIE B. HOGEMAN
BY 
ATTORNEY

United States Patent Office 3,260,742
Patented July 12, 1966

---

3,260,742
PROCESS FOR RECOVERY OF ADIPIC ACID PRECURSORS
Wylie Barrow Hogeman, Pensacola, Fla., assignor to Monsanto Company, a corporation of Delaware
Filed Sept. 18, 1962, Ser. No. 224,435
5 Claims. (Cl. 260—533)

This invention relates to improvements in the oxidation of cyclohexane to adipic acid and more particularly is directed to the process which involves the oxidation of cyclohexane with molecular oxygen to primary oxidation products followed by oxidation of these primary products to adipic acid by nitric acid or other means.

In the aforesaid process, according to prior art, the cyclohexane is oxidized with air to cyclohexanol, cyclohexanone, peroxides and various other oxidized products; the unoxidized cyclohexane is recovered from these primary oxidation products; and the cyclohexane free oxidation product is further oxidized to adipic acid with the nitric acid. In this manner the cyclohexanol and cyclohexanone are not isolated, and the ultimate yield of adipic acid is high because attending miscellaneous adipic acid precursors are converted to adipic acid in the nitric acid oxidation step.

This described process is not free from difficulty however. The quality of the adipic acid obtained is not the best and the nitric acid oxidation step is not as efficient as it could be because of the various primary oxidation products which are present in the nitric acid oxidation feed. Some of these products give rise to the formation of glutaric and succinic acids, both of which must be removed in the adipic acid recrystallizer thereby increasing the overall cost of the process markedly.

A number of methods have been devised for treating the cyclohexane oxidation product to prepare a nitric acid oxidation feed which is selective to adipic acid precursors, however, all the methods thus far are either too expensive for the increased yield of adipic acid obtained or cause the loss of adipic acid precursors in waste streams or in process streams by esterification or other reactions.

An example of such a process is one which has much commercial favor. In this process, the reaction product which results from the air oxidation of cyclohexane is mixed with water and this aqueous mixture is stripped of unoxidized cyclohexane which is returned to the air oxidizing units. The tails from the cyclohexane or hydrocarbon stripping are refined further by distillation, crystallization and filtration to prepare a feed stream for the nitric acid oxidizers which is extremely rich in adipic acid precursors. It has been found, however, that unaccountable losses of adipic acid precursors occur in the operation of this process.

An object of this invention is therefore to provide an improved method for processing the reaction product from the oxidation of cyclohexane to produce economically a nitric acid oxidizer feed containing a maximum amount of adipic acid precursors.

Another object of this invention is to provide an improved method for processing the reaction product from the oxidation of cyclohexane to prepare a nitric acid oxidizer feed which prevents losses of adipic acid precursors in the said processing.

A further object of this invention is to provide an improved method for processing the reaction product from the oxidation of cyclohexane to prepare a feed for the nitric acid oxidation step which contains a minimum of succinic and glutaric acids or the precursors therefor.

Other objects and advantages of the invention will appear from the following description.

It has been found that surprisingly better yields of adipic acid can be obtained from the oxidation of cyclohexane by the process of this invention than can be obtained by heretofore known processes. Generally, the process involves air oxidation of cyclohexane, addition of water to the oxidation product, and then substantially separate treatment of the oil and aqueous layers of the air oxidation product formed to obtain adipic acid precursors for subsequent oxidation by nitric acid or other means. In distinction over other prior processes, this process provides a better utilization of necessary equipment and permits the production of increased amounts of adipic acid by more efficient utilization of the available adipic acid precursors by preventing their loss during processing. Also, because of lower heat loading, larger volumes of material can be processed through equipment of a given size.

The objects of this invention are accomplished by a process which will be more readily understood by reference to the accompanying flow diagram, the figure, which shows the oxidation of cyclohexane followed by separation of various reaction products for subsequent oxidation to adipic acid by means of nitric acid. The figure illustrates the liquid phase air oxidation of cyclohexane by a process in which the cyclohexane is pumped at 1 from the cyclohexane storage (not shown) to the oxidizer 2 with air entering the oxidizer 2 at 3. As an example, a typical oxidizer may consist of three stirred autoclave oxidizers in series equipped with reflux condensers for water take-off and operating at a temperature of from 130° C. to 190° C. at superatmospheric pressures. Water is added at 4 to the oxidation reaction product leaving the oxidizer at 5 to prevent plugging of the lines with water soluble solid contained therein, and this aqueous mixture may or may not be cooled prior to its entry into decanter 6 where the oil layer and aqueous layer are permitted to separate with the oil layer being drawn off to upper layer storage 7 and the aqueous layer to lower layer storage 8.

The upper layer or oil layer, which is rich in cyclohexanone and cyclohexanol and contains the unoxidized cyclohexane and other water insoluble oxidation products, is transferred as shown by line 9 to a dry hydrocarbon stripper 10 which may be any standard rectification column such as a sieve tray or bubble cap tray column designed to remove a major portion of the unoxidized cyclohexane from the upper layer of the oxidation product. Unoxidized cyclohexane is removed from the column as shown by line 16 and returned to the oxidizing units as indicated by line 13. As a typical example, the dry hydrocarbon stripper 10 may be a thirty tray bubble cap column operated with a column top temperature of 60° C. to 100° C. and at atmospheric pressure. Vacuum or superatmospheric pressure may be used if desired.

Oxidation product from which a major portion of the unoxidized cyclohexane has been removed leaves the dry hydrocarbon stripper 10 and enters the wet hydrocarbon stripper 18 as shown by line 17. The wet hydrocarbon stripper 18 also may be any standard rectification column, such as a sieve tray or bubble cap column, designed to remove essentially all the remaining unoxidized cyclohexane from the upper layer of the oxidation product.

Water which enters the hydrocarbon stripper at 11 from the aqueous layer of decanter 12 goes overhead also in wet hydrocarbon stripper 18. This overhead or make stream 19 may be cooled and is then permitted to separate into a cyclohexane layer and an aqueous layer in decanter 14 with the cyclohexane layer being returned to the oxidizer, as shown by line 13, and the aqueous layer being sent to waste, as shown by line 15. A portion of the waste water stream of line 15 may be returned to the wet hydrocarbon stripper 18 as reflux, if desired, as shown by line 31. The tails from the wet hydrocarbon stripper proceed, as shown by line 20, to the KA refiner 22 where the final distillation purification step of the process takes place.

A typical example of a wet hydrocarbon stripper 18 may be a thirty tray bubble cap column operated at a column top temperature of 60° C. to 100° C. and suitable pressure to effect the desired separation.

In the KA refiner the separation of the adipic acid precursors from both the upper and lower layers takes place simultaneously but essentially without contact of the adipic acid precursors therein. The aqueous lower layer 8 which contains adipic acid, water, water soluble esters, traces of cyclohexanone, and other water soluble non-volatile residue is fed to the bottom portion of the KA refiner, as shown by line 21. Tails from the wet hydrocarbon stripper which contain cyclohexanone, cyclohexanol, and other water insoluble oxidation products are fed to the upper portion of the KA refiner which is a standard rectification column and may be of any type such as a sieve tray column or bubble cap tray column. After cooling, the make stream 23 from the KA refiner goes to decanter 12 where the aqueous layer and oil layer are permitted to separate with the aqueous layer being returned to the wet hydrocarbon stripper as shown by line 11 and discussed previously. A portion of the aqueous stream 11 may be returned to the KA refiner as reflux if desired, as shown by line 24. The oil layer from the decanter 12 is pumped to adipic acid precursor storage 25, as shown by line 26, and the tails from the KA refiner proceed to crystallizer 27, as shown by line 28. In a typical example the KA refiner may be a thirty tray bubble cap rectification column operated with a top temperature of 80° C. to 120° C. and a bottom temperature of 100° C. to 140° C. depending upon whether the pressure within the column is subatmospheric, atmospheric, or superatmospheric.

The crystallizer 27 is operated to selectively precipitate adipic acid precursors from the material of line 28 and may be of any type such as an agitated vacuum vessel. In a typical example of an agitated vacuum crystallizer the operating temperature may be 30° C. to 60° C. depending upon the operating pressure within the crystallizer.

As shown by line 29, the material leaving the crystallizer enters filter 30 where selectively precipitated adipic acid precursors formed in the crystallizer are removed from the remaining liquid. The filter cake which contains adipic acid, non-volatile residue which is insoluble in the remaining non-aqueous liquor at the operating conditions of the crystallizer, and small amounts of glutaric and succinic acids are transferred to the adipic acid precursor storage 25 as was the material from line 26. The adipic acid precursors in adipic acid precursor storage are then ready for subsequent treatment by nitric acid oxidation or other process as shown by line 33. The mother liquor leaving filter 30 at 32 may be used as fuel or may be sent to waste as desired.

As can be seen clearly from the above description of the flow of materials within the various streams of the process of this invention, the upper layer or oil layer and the lower layer or aqueous layer of the products of the air oxidation of cyclohexane are not permitted to come into contact with each other at any time when conditions of temperature and pressure may be conducive to interreaction of the products to the detriment of the adipic acid precursor yield. The increase in yield of adipic acid precursors which results from the separate treatment of the upper and lower layers was completely unexpected, and although the exact reactions which are thought to be prevented by the individual treatment of the layers are not known, it is postulated that esterification of adipic acid precursors in the oil layer with adipic acid precursors or water soluble non-volatile residue in the aqueous layer was taking place during either the stripping of the cyclohexane or the separation of the water and non-volatile residue from the adipic precursors or both. The possibility of unwanted reactions in these parts of the process are avoided by the process of this invention. Only the oil layer or upper layer and water removed from the aqueous or lower layer are subjected to the stripping of the unoxidized cyclohexane, and in the subsequent separations in the KA refiner, the entry of the streams to this rectification column, one to the top portion and the other to the bottom portion, under the conditions of temperature and pressure, are such that essentially only the water vapor from the aqueous layer contacts the adipic acid precursors contained in the oil layer stream and only water insoluble non-volatile residue from the oil layer contacts the adipic acid precursors contained in the aqueous layer stream. As described previously, the oil layer from which the cyclohexane has been stripped is fed into the top portion of the KA refiner and the aqueous layer is fed into the bottom portion of the column. With the desired conditions of temperature and pressure within the column, all the oil layer goes overhead into the make stream except a small amount of water insoluble non-volatile or high boiling residue, material to be discarded from the process, which passes down the column and exits with the KA refiner tails. At the same time, only the water from the aqueous layer passes up through the column to contact the oil layer and go overhead in the make stream with the adipic acid precursors contained therein.

The improvement in the yield of adipic acid and adipic acid precursors which is obtained by the process of this invention is exemplified by the data in Table I below which shows a comparison of the adipic acid and adipic acid precursor yields as obtained from the old process which has much commercial favor and the new process of this invention. It is to be emphasized that the equipment of the processes, i.e., distillation columns, air oxidizing units and other component parts, are the same for both processes. Only the process utilization of the equipment is changed. The data shown under the heading "old" were obtained when the upper layer and lower layer, as shown in the figure at 7 and 8, were fed jointly in metered quantities to hydrocarbon strippers 10 and 18 of the figure in series and the tails from the stripping operation were fed to the KA refiner 22. The data shown under "new" were obtained when the process of this invention was used. All data were obtained from operation of a continuous process and have the same units which are pounds per unit of time based upon a constant flow rate from the units for the air oxidation of cyclohexane.

TABLE I.—ADIPIC ACID POTENTIAL IN PROCESS STREAMS BEFORE AND AFTER HYDROCARBON STRIPPING AND REFINING

| Process Stream Component | Before HCS Stripping | After HCS Stripping and Before Refining | Product Available for Nitric Acid Oxidation |
| --- | --- | --- | --- |
| 1. Adipic acid precursors: | | | |
| a. Old process | 224.9 | 218.0 | 194.0 |
| b. New process | 224.9 | 222.4 | 201.7 |
| 2. Adipic acid: | | | |
| a. Old process | 24.3 | 18.0 | 10.8 |
| b. New process | 24.3 | 23.7 | 13.2 |
| 3. Esters: | | | |
| a. Old process | 18.3 | 25.0 | 4.7 |
| b. New process | 18.3 | 16.9 | 4.7 |
| 4. Valeric acid: | | | |
| a. Old process | 17.2 | 18.8 | 3.4 |
| b. New process | 17.2 | 16.9 | 2.8 |

As can be seen from Table I above, the total adipic acid potential of the streams leaving the air oxidation units and entering the recovery processes of the new and novel method of this invention and the old method which had much commercial favor is the same; i.e., the sum of the adipic acid precursors and adipic acid available in the streams. In the process of this invention whereby only the oil layer is subjected to stripping and the water layer is bypassed to the bottom of the refiner, there is an overall increase of approximately 5% in yield of adipic acid potential of the material to be fed to further oxidation steps, such as nitric acid oxidation, over that available when the oil and aqueous layers are fed jointly to the hydrocarbon stripper and the resulting product commingled in the refining operation. This increased yield is obtained, as is shown in Table I, without an increase in other by-products of the process.

Another important advantage which is apparent from the preceding description is the reduction of heat required for the stripping of the cyclohexane and the increased vapor volume available in the hydrocarbon stripper columns, due to the absence of water therein. These advantages permit a sizeable increase in volume throughput for any given column size over that which was possible in previous processes and thereby permit important savings in processing costs and lower heat requirements.

As various modifications of the invention as described above will be apparent to those skilled in the art, it will be understood that the invention is not limited to the foregoing description thereof except as is defined in the appended claims.

What is claimed is:

1. In the manufacture of adipic acid by oxidizing cyclohexane in liquid phase with molecular oxygen in suitable means at a temperature of 130° C. to 190° C. and superatmospheric pressure to cyclohexane oxidation product comprising adipic acid precursors followed by nitric acid oxidation of said adipic acid precursors to adipic acid, the continuous process for separation of said adipic acid precursors from said cyclohexane oxidation product which comprises, in combination, the steps of:
    a. injecting water into said cyclohexane oxidation product;
    b. decanting the resulting mixture into a first oil phase and a first aqueous phase;
    c. stripping substantially all unoxidized cyclohexane from said first oil phase;
    d. distilling stripped said first oil phase in the top portion of a distillation means operated with a top temperature controlled at 80° C. to 120° C.;
    e. distilling said first aqueous phase simultaneously in the bottom portion of said distillation means operated with a bottom temperature controlled at 100° C. to 140° C;
    f. controlling the pressure in said distillation means between subatmospheric and superatmospheric to permit only the water from said first aqueous phase to contact said stripped first oil phase in said distillation means and go overhead therewith in the distillate;
    g. decanting said distillate from said distillation means into a second oil phase and a second aqueous phase;
    h. precipitating adipic acid precursors at a subatmospheric pressure and a temperature of 30° C. to 60° C. from bottoms from said distillation means; and
    i. combining precipitated adipic acid precursors and said second oil phase as feed for said nitric acid oxidation to adipic acid.

2. The process of claim 1 wherein said stripped first oil phase is subjected to a second cyclohexane stripping in the presence of said second aqueous phase prior to said distilling step.

3. The process of claim 1 wherein a portion of said second aqueous phase is returned to said distillation means as reflux.

4. The process of claim 1 wherein stripped said unoxidized cyclohexane is recovered and returned to the liquid phase cyclohexane oxidation step.

5. The process of claim 2 wherein distillate from said second cyclohexane stripping is decanted into a third oil phase and a third aqueous phase, said third oil phase being returned to the cyclohexane oxidation step and a portion of said third aqueous phase being returned to said cyclohexane stripping step as reflux.

References Cited by the Examiner

UNITED STATES PATENTS

| | | | |
|---|---|---|---|
| 2,439,513 | 4/1948 | Hamblet et al. | 260—533 |
| 2,452,741 | 11/1948 | Fleming | 260—533 |
| 2,703,331 | 3/1955 | Goldbeck et al. | 260—531 |

FOREIGN PATENTS 1,266,886 6/1961 France.

LORRAINE A. WEINBERGER, *Primary Examiner.*

LEON ZITVER, *Examiner.*

G. P. D'ANGELO, I. R. PELLMAN,
*Assistant Examiners.*